(12) United States Patent
Crawford

(10) Patent No.: US 9,114,523 B2
(45) Date of Patent: Aug. 25, 2015

(54) TOOL FOR INSERTING CONTAINERS INTO ICE

(71) Applicant: Timothy D. Crawford, Golden, CO (US)

(72) Inventor: Timothy D. Crawford, Golden, CO (US)

(*) Notice: Subject to any disclaimer, the term of this patent is extended or adjusted under 35 U.S.C. 154(b) by 0 days.

(21) Appl. No.: 13/971,480

(22) Filed: Aug. 20, 2013

(65) Prior Publication Data

US 2014/0049061 A1    Feb. 20, 2014

Related U.S. Application Data

(60) Provisional application No. 61/691,251, filed on Aug. 20, 2012.

(51) Int. Cl.
*B25J 1/00* (2006.01)
*A47G 23/00* (2006.01)

(52) U.S. Cl.
CPC .. *B25J 1/00* (2013.01); *A47G 23/00* (2013.01)

(58) Field of Classification Search
CPC ....... A47J 45/00; A47J 47/00; A47J 2202/00; F16B 2/04; F16B 2/06; A47F 13/08; B25J 1/00; A47G 23/00
USPC .......... 294/219, 86.42, 176, 26.5; 7/126, 151, 7/152; 141/331, 332–345; 81/90.1–90.9, 81/91.1–91.3, 485, 3.7, 3.05
See application file for complete search history.

(56) References Cited

U.S. PATENT DOCUMENTS

| | | | | | |
|---|---|---|---|---|---|
| 235,444 | A | * | 12/1880 | Marving | 81/3.05 |
| 1,138,850 | A | * | 5/1915 | Deming | 294/26.5 |
| 2,605,582 | A | * | 8/1952 | Allen | 43/100 |
| 4,330,894 | A | * | 5/1982 | Hayden | 7/152 |
| 5,121,779 | A | * | 6/1992 | Green | 141/337 |
| 5,337,798 | A | * | 8/1994 | Martin | 141/331 |
| 6,152,198 | A | * | 11/2000 | Nguyen | 141/337 |
| 6,460,200 | B1 | * | 10/2002 | Mottale et al. | 4/144.4 |
| 7,383,863 | B2 | * | 6/2008 | Salani et al. | 141/337 |
| 8,616,090 | B2 | * | 12/2013 | Ferraro | 81/3.48 |
| 2014/0238537 | A1 | * | 8/2014 | Kikuchi et al. | 141/83 |

* cited by examiner

*Primary Examiner* — Saul Rodriguez
*Assistant Examiner* — Gabriela Puig
(74) *Attorney, Agent, or Firm* — Klaas, Law, O'Meara & Malkin PC; Robert W. Nelson, Esq

(57) ABSTRACT

Tools for inserting containers into ice are disclosed herein. An embodiment of a tool includes a first end and a second end. A ring is located proximate the first end. The ring has a hole, wherein a container is receivable in the hole. The tool has a first state when no container is received in the hole and a second state when a container is received in the hole. At least one sheet extends between the ring and the second end, the sheet forms a substantially conical shape when the tool is in the first state and a less conical shape when the tool is in the second state. An opening is located proximate the second end, wherein the container exits the tool via the opening.

16 Claims, 6 Drawing Sheets

TOOL FOR INSERTING CONTAINERS INTO ICE

This patent application claims priority to U.S. provisional patent application 61/691,251 for TOOL FOR INSERTING CONTAINERS INTO ICE, filed on Aug. 20, 2012, which is incorporated for all that is disclosed therein.

BACKGROUND

Crushed or cubed ice is used to cool containers, such as beverage containers. The containers include metal cans and glass bottles. A bin is at least partially filled with ice and the containers are placed into the ice by hand. Inserting containers by hand is very time consuming and painful for the person inserting the containers. In addition, the ice may become contaminated by the person inserting the containers.

SUMMARY

Tools for inserting containers into ice are disclosed herein. An embodiment of a tool includes a first end and a second end. A ring is located proximate the first end. The ring has a hole, wherein a container is receivable in the hole. The tool has a first state when no container is received in the hole and a second state when a container is received in the hole. At least one sheet extends between the ring and the second end, the sheet forms a substantially conical shape when the tool is in the first state and a less conical shape when the tool is in the second state. An opening is located proximate the second end, wherein the container exits the tool via the opening.

DETAILED DESCRIPTION

Embodiments of tools for inserting containers into ice are disclosed herein. The ice may be located in bins, coolers or other storage devices. The ice may be in cubed form or crushed form. The containers may be cans, bottles, or other devices of any shape. The tools described herein enable a user (the person inserting the container into the ice) to insert the container into the ice without having to physically contact the ice. Therefore, the user does not contaminate the ice and does not have to insert his hand into very cold ice. In addition, the tools described herein provide for orderly placing of the containers into the ice, which is difficult or impossible using manual techniques.

Figure 1:
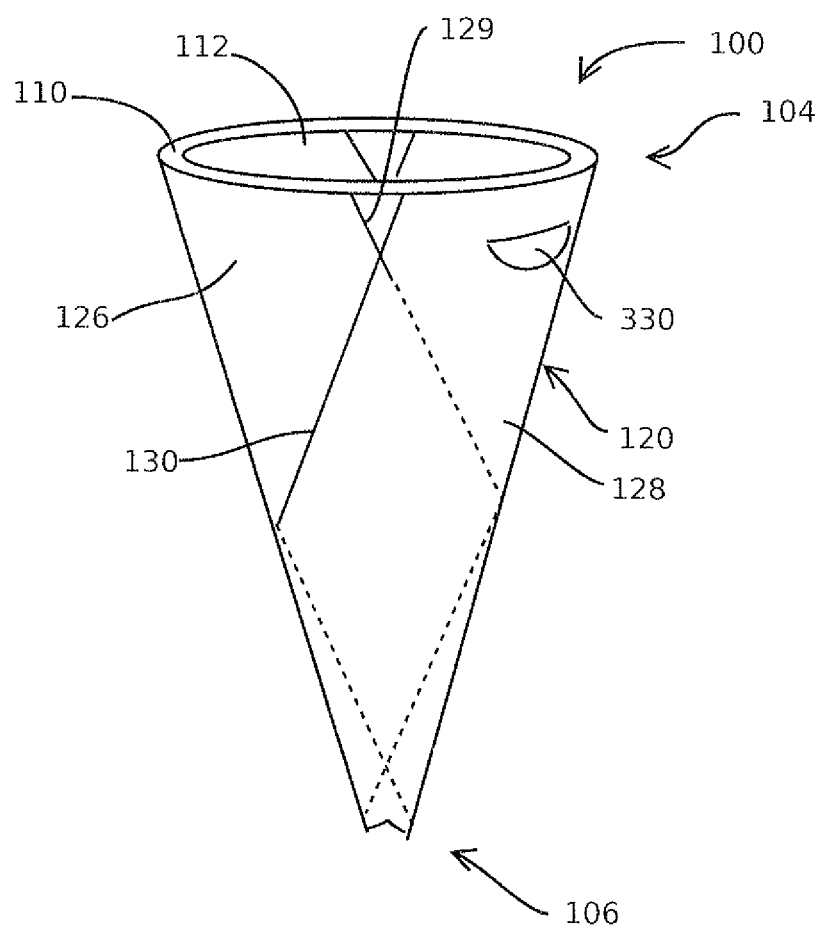
FIG. 1 is a top isometric view of a tool for inserting containers into ice.

A top isometric view of an embodiment of a tool 100 for inserting a container into ice is shown in FIG. 1. The tool 100 has a top end 104 and a bottom end 106. The top end 104 has a ring 110 with a hole 112 located in the ring 110. The hole 112 is sized to receive the container (not shown in FIG. 1) that will be placed into the ice (not shown). The ring 110 may be a plastic that is substantially rigid. In some embodiments, the ring 110 is slightly flexible.

Figure 2:
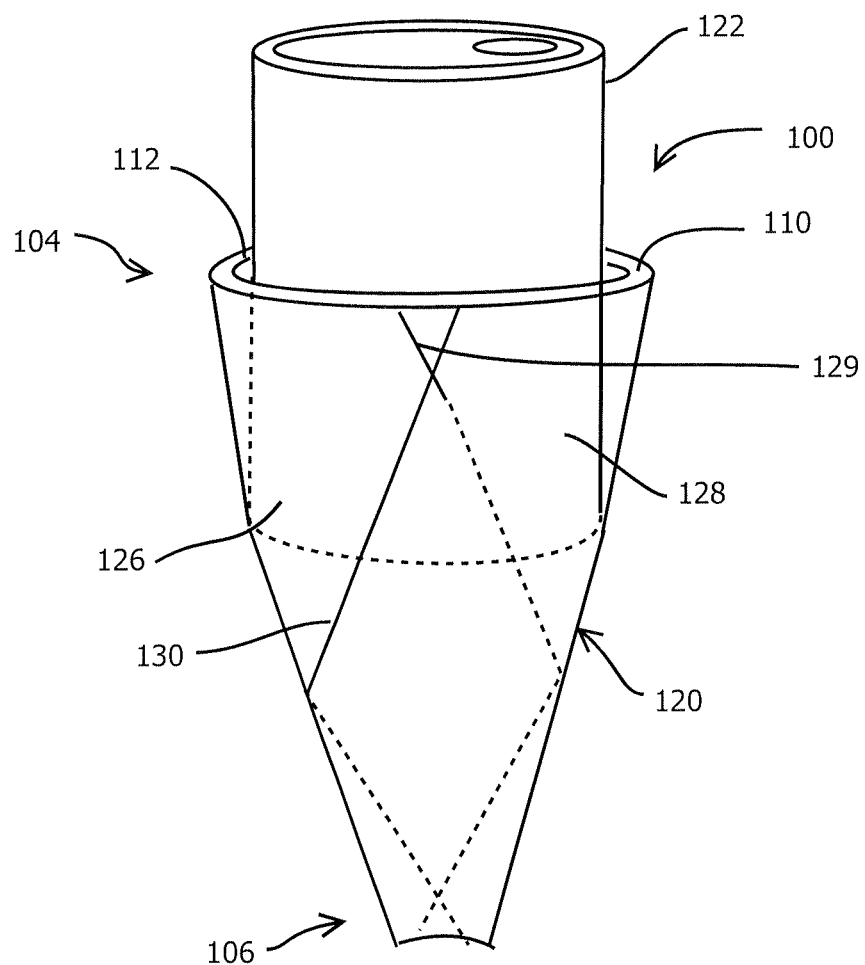
FIG. 2 is a top isometric view of the tool of FIG. 1 with a container partially inserted therein.
Figure 3:
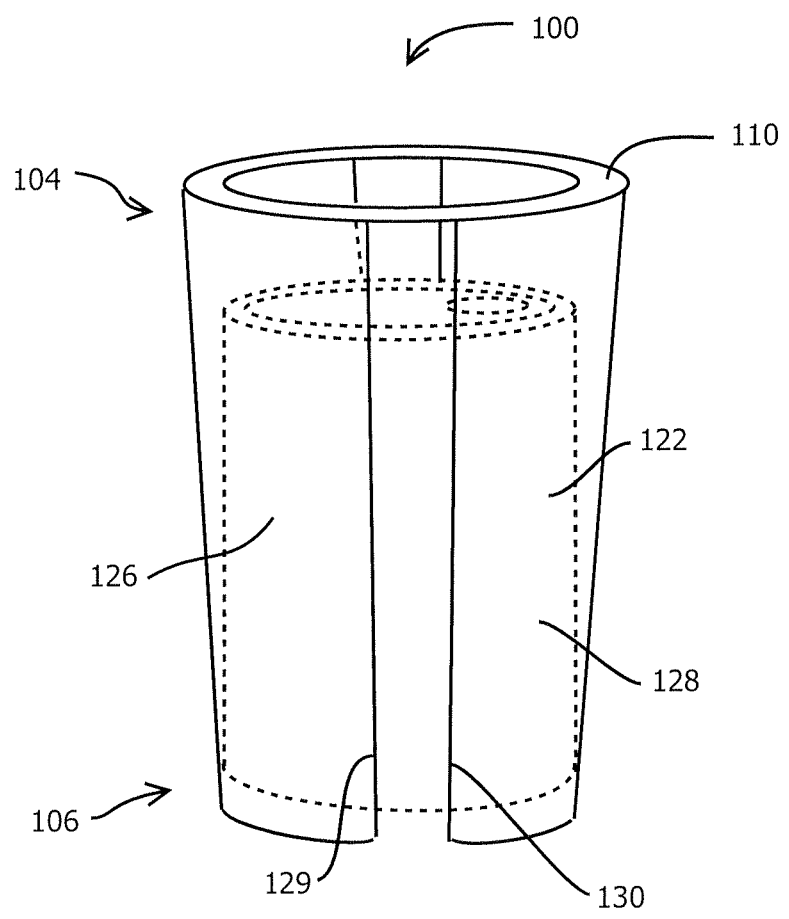
FIG. 3 is a top isometric view of the tool of FIG. 1 with a container fully inserted wherein the tool is positioned to insert the container.

Additional reference is made to FIG. 2, which is a top isometric view of the tool 100 with a can 122 located therein and FIG. 3, which is a top isometric view of the tool 100 depositing a can 122 in ice. The tool 100 has sides sheets 120 that extend between the ring 110 and the bottom end 106. When no can is located in the tool 100, the side sheets 120 form a cone with a vertex located at the bottom end 106 as shown in FIG. 1. The embodiment of Figs. 1-3, the tool 100 has two side sheets 120 that are attached or otherwise coupled to the ring 110. The two side sheets 120 are referred to individually as the first sheet 126 and the second sheet 128. The side sheets 120 are formed so that they roll onto each other to form the cone of FIG. 1. Therefore, the side sheets 120 are shaped as shown in FIG. 1. However, when a container 122 is forced through the opening 112 in the ring 110, the side sheets 120 are temporarily deformed as shown in FIGS. 2 and 3 and as described below.

The side sheets 120 have edges that extend from the ring 110 to the bottom end 106. In the embodiments of FIGS. 1-3, the first sheet 126 has an edge 129 and the second sheet 128 has an edge 130. In some embodiments, a piece of flexible material (not shown), such as cloth extends between the edges 129, 130. The flexible material prevents ice from entering into the tool 100 from the side, but does not interfere with the insertion of the container 122 into the tool 100.

The side sheets 120 are shown as being attached to the peripheral of the ring 110. The side sheets 120 are flexible enough to be able to move while being adhered or otherwise attached to the periphery of the ring 110. In some embodiments, the side sheets 120 may be more rigid so that they are pivotally attached to the ring 110. In such embodiments, the side sheets 120 pivot relative to the ring 110.

Having described the tool 100, its operation will now be described. The user inserts the bottom end 106 of the tool 100 into ice (not shown). The ice may be crushed or cubed ice wherein the conical shape of the tool 100 moves the ice to form a conical opening in the ice. Referring to FIG. 2, the user then inserts a container 122 through the opening 112 in the ring 110. In the embodiment of FIGS. 2 and 3, the container 122 is a beverage can. As the container 122 is forced through the opening 112 it contacts the side sheets 120. The force of the container 122 against the side sheets 120 causes the side sheets 120 to unravel or otherwise open as shown in FIG. 2. In doing so, the ice on the exterior of the tool 100 is pushed away to form an opening in the ice that is the shape of the container 122.

When the container 122 reaches the bottom end 106 of the tool, the side sheets 120 have opened enough to enable the container 122 to pass through the bottom end 106 as shown in FIG. 3. The ice has been moved enough to form a hole in which the container 122 is deposited. In the embodiment of FIG. 3, the hole is cylindrical because the container is a beverage can. The tool 100 is lifted out of the ice and the container 122 is left behind. In some embodiments, the side sheets 120 have low friction surfaces relative to the container 122, which prevent the can from being lifted out of the ice as the tool 100 is removed from the ice.

Figure 4:
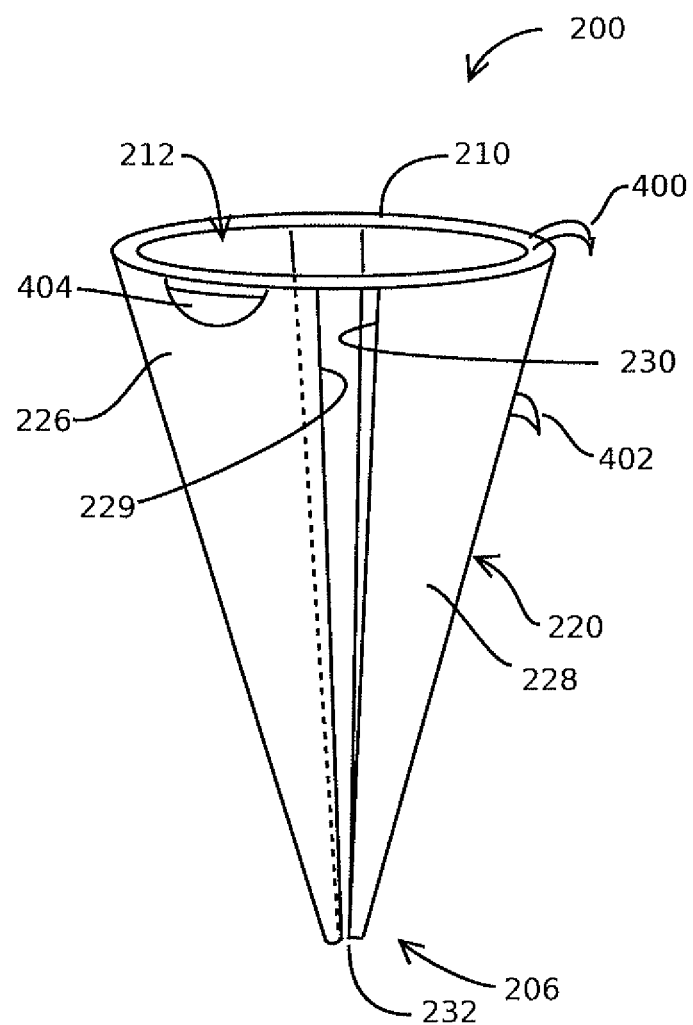
FIG. 4 is a top perspective view of another embodiment of a tool for inserting containers into ice.
Figure 5:
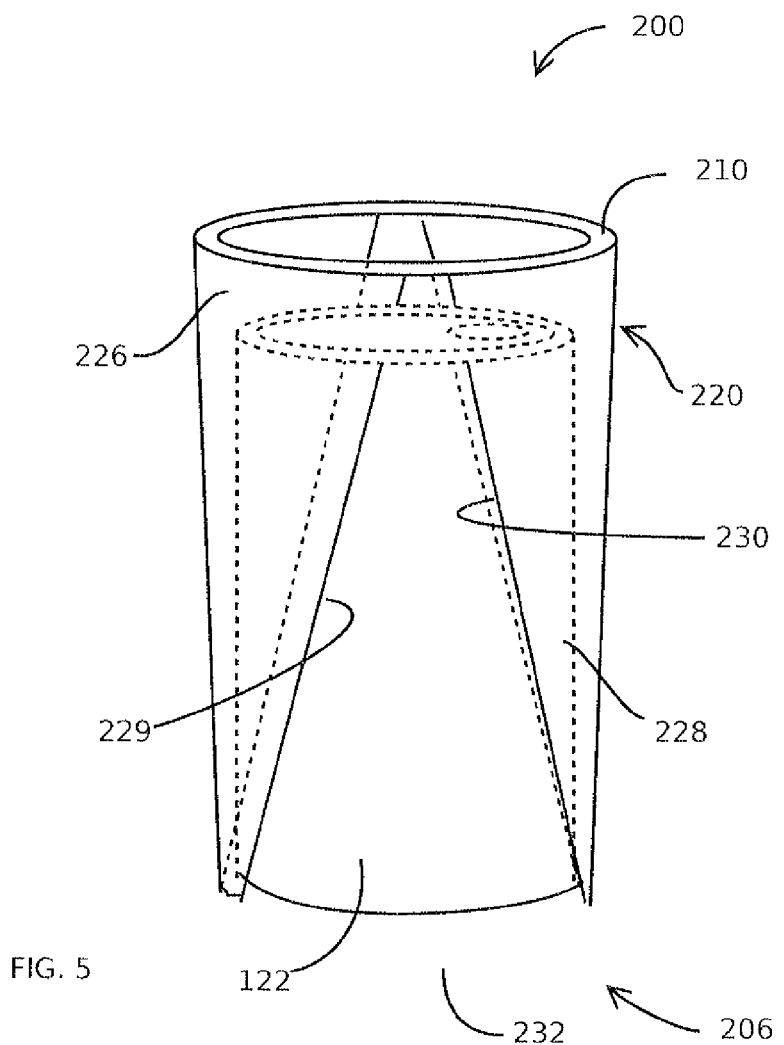
FIG. 5 is a top perspective view of the tool of FIG. 4 with a container being inserted into ice.

A similar tool 200 to the tool 100 is shown in FIGS. 4 and 5. The tool 200 is substantially similar to the tool 100, except for the side sheets 220 on the tool 200.

The embodiment of the tool 200 has two side sheets 220, that extend to form a cone as shown in FIG. 4. The side sheets 220 are referred to individually as the first side sheet 226 and the second side sheet 228. The side sheets 220 do not wrap around each other as the side sheets 120 on the tool 100. Rather the side sheets 220 extend to a vertex at the bottom end 206 of the tool 200 to form a cone.

As with the tool 100, the tool 200 as a ring 210 that forms an opening 212. The side sheets 220 extend from the ring 210. The side sheets 220 have edges 229, 230 that are attached to the ring 210. The edges 229, 230 of the side sheets 220 may abut or overlap when the tool 200 does not have a container located therein. In some embodiments, a small gap 232 may extend between the edges 229, 230. In some embodiments, a flexible material (not shown) may extend between the edges 229, 230 to fill the gap 232 and prevent ice from entering the tool when in use.

The use of the tool 200 is substantially similar to the use of the tool 100 described above. In use, the gap 232 expands as a container 122 is inserted into the tool 200. The tool 200 is then removed from the ice and the container 122 is left behind. The side sheets 220 of the tool 200 tend to move rather than unravel in order to form an opening in the ice to insert the container 122.

In some embodiments, the side sheets 120, 220 are pivotally attached to the rings 110, 210. In other embodiments, the side sheets 120, 220 are attached to the rings 110, 210 by a hinge mechanism (not shown) that allows the side sheets 120, 220 to rotate relative to the rings 110, 210. In some embodiments, a handle or the like is attached to the rings 110, 210 or formed into the rings 110, 210, wherein a user manipulates the tool 100, 200 by using the handle. The handle further prevents the user from contacting the ice. The handle enables a user to manipulate the tool 100, 200. In some embodiments, the ring 110 may have raised portions that a user may grab during use of the tool 100, 200.

The tools 100, 200 are shown as being used to insert a single container 122 into ice. However, the tools 100, 200 may be used to simultaneously insert a plurality of containers into ice. For example, the side sheets 120, 220 may extend the length of several containers. The tool is inserted into ice and several containers are inserted through the rings 110, 210 before the tools 100, 200 are removed from the ice. The result is that several containers are inserted into the ice and stacked one on top of another.

In some embodiments, the tools 100, 200 have openers for containers attached thereto or formed therein. With reference to the FIG. 4, the ring 210 may have a bottle opener 400 attached thereto. A user may grasp the ring 210 of the side sheets 220 to locate the bottle opener onto the container. The ring 210 or side sheets 220 may provide sufficient leverage to open the bottle. In other embodiments, the side sheets 120, 220 are rigid enough to have an opening 330, FIG. 1, formed therein that functions as a bottle or container opener. In yet other embodiments, an opener 402, FIG. 4, may be affixed to the side sheets 120, 220. In another embodiment, an opener 404 is formed into the ring 210.

Figure 6:
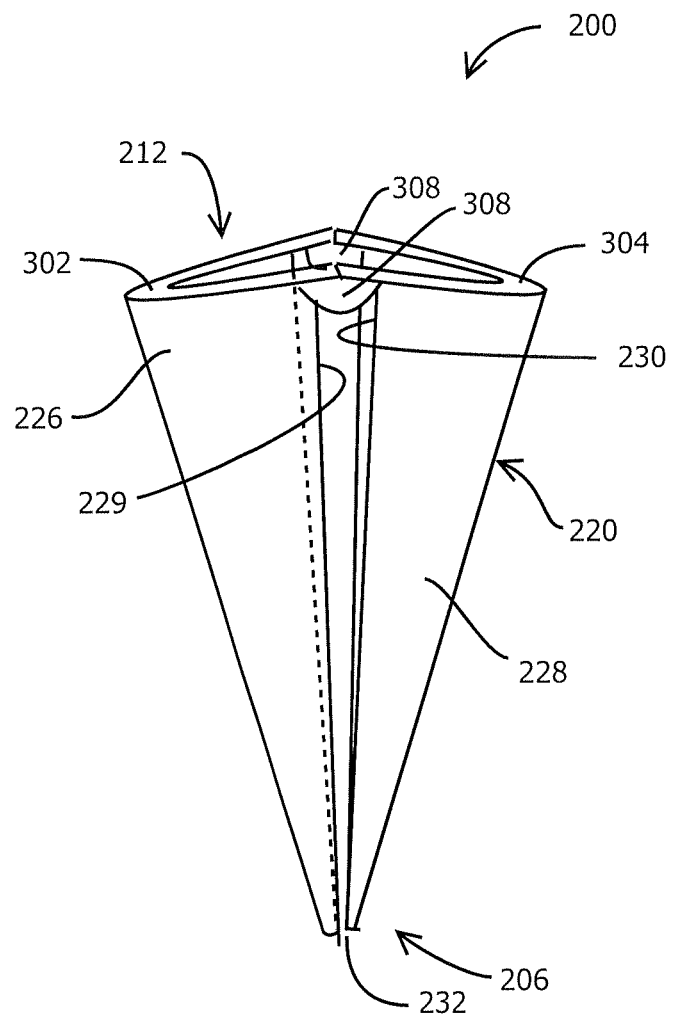
FIG. 6 is an embodiment of the tool of FIGS. 4 and 5 with the ring split into two portions.

The rings 110, 210 have been illustrated as being separate items. In some embodiments, the rings 110, 210 may be integral with the side sheets 120, 220. Accordingly, the rings 110, 210 may be members of the side sheets 120, 220 that form the holes 112, 212 in which the containers are inserted. An embodiment, the rings 302, 304 that may be in two portions is shown in FIG. 6, which is a modification of the tool 200 of FIGS. 4 and 5. The portions 302, 304 are connected by hinge devices 308 that pivotally connect the portions 302, 304. In some embodiments, the hinge devices 308 are spring loaded in order to force the tool into the configuration of FIGS. 4 and 6.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A tool for inserting containers into ice, the tool comprising:
    a first end;
    a second end;
    a ring proximate the first end, the ring having a hole, wherein a container is receivable in the hole, the tool having a first state when no container is received in the hole and a second state when a container is received in the hole;
    a first sheet and a second sheet extending between the ring and the second end, the first sheet and the second sheet forming a substantially conical shape when the tool is in the first state and a substantially cylindrical shape when the tool is in the second state wherein the first sheet at least partially overlaps the second sheet; and
    an opening proximate the second end, wherein the container exits the tool via the opening when the tool is in the second state.

2. The tool of claim 1, wherein the first sheet has an edge and the second sheet has an edge and wherein the edge of the first sheet is proximate the edge of the second sheet when the tool is in the second state.

3. The tool of claim 1, wherein the first sheet is wrapped about the second sheet when the tool is in the first state and wherein the first sheet unwraps from the second sheet as the tool transitions to the first state.

4. The tool of claim 1, wherein the opening enlarges as the tool transitions from the first state to the second state.

5. The tool of claim 1, wherein the ring comprises two portions that are pivotally connected to each other.

6. The tool of claim 1, wherein at least one of the first sheet or the second sheet flexes as the tool transitions between the first state and the second state.

7. The tool of claim 1, wherein the ring includes a first portion and a second portion, wherein the first sheet is connected to the first portion and the second sheet is connected to the second portion.

8. The tool of claim 7 and further comprising at least one hinge mechanism connecting the first portion of the ring to the second portion of the ring.

9. The tool of claim 7, and further comprising a spring mechanism located between the first portion and the second portion of the ring, the spring mechanism forcing the tool into the first state.

10. The tool of claim 1 wherein the ring and at least one of the first sheet and the second sheet are integrally formed.

11. The tool of claim 1 and further comprising an opener for opening the container affixed thereto.

12. The tool of claim 11, wherein the opener is formed into the first sheet.

13. The tool of claim 11, wherein the opener is affixed to the first sheet.

14. The tool of claim 11, wherein the opener is formed into the ring.

15. The tool of claim 11, wherein the opener is affixed to the ring.

16. A tool for inserting containers into ice, the tool comprising:
    a first end;
    a second end;
    a ring proximate the first end, the ring having a hole, wherein a container is receivable in the hole, the tool having a first state when no container is received in the hole and a second state when a container is received in the hole;

a first sheet extending between the ring and the second end, the first sheet forming a substantially conical shape when the tool is in the first state and substantially cylindrical shape when the tool is in the second state;

a second sheet extending between the ring and the second end, the second sheet forming a substantially conical shape when the tool is in the first state and a substantially cylindrical shape when the tool is in the second state; and an opening proximate the second end, wherein the container exits the tool via the opening;

wherein the first sheet at least partially wraps around the second sheet when the tool is in the first state.

* * * * *